(12) United States Patent
Hartinger

(10) Patent No.: US 6,312,748 B1
(45) Date of Patent: Nov. 6, 2001

(54) METHOD FOR INCREASING THE YIELD OF FRUIT JUICE IN THE EXTRACTION OF FRUIT JUICE CONCENTRATE

(75) Inventor: Richard Hartinger, Rinteln (DE)

(73) Assignee: Wesergold Getrankeindustrie GmbH & CO KG, Rinteln (DE)

( * ) Notice: Subject to any disclaimer, the term of this patent is extended or adjusted under 35 U.S.C. 154(b) by 0 days.

(21) Appl. No.: 09/601,554
(22) PCT Filed: Feb. 3, 1999
(86) PCT No.: PCT/EP99/00658
§ 371 Date: Sep. 25, 2000
§ 102(e) Date: Sep. 25, 2000
(87) PCT Pub. No.: WO99/39590
PCT Pub. Date: Aug. 12, 1999
(51) Int. Cl.[7] .................................................. A23L 1/28
(52) U.S. Cl. .................. 426/489; 426/599; 426/490; 426/492; 426/495
(58) Field of Search .................................. 426/489, 599, 426/490, 492, 495

(56) References Cited

U.S. PATENT DOCUMENTS 4,463,025 * 7/1984 Strobel .
4,942,051 * 7/1990 Sardisco .

FOREIGN PATENT DOCUMENTS

137671 * 4/1985 (EP) .
2680177 * 2/1993 (FR) .
91/03172 * 3/1991 (WO) .

* cited by examiner

Primary Examiner—Anthony J. Weier
(74) Attorney, Agent, or Firm—Foley & Lardner

(57) ABSTRACT

The invention concerns in general a method for the extraction of fruit juice concentrate, to produce a higher yield of fruit juice than that achieved by known methods. For this purpose juice is first extracted from the fruits in a juice extraction unit (1), producing a mixture of pulp and fruit juice. This mixture of pulp and fruit juice is then divided into pulp and primary juice (2). This pulp is then separated into pulp residues and secondary juice (7). The secondary juice is then pasteurised (8) and mixed with the primary juice. This mixture of primary juice and secondary juice is finally further processed into fruit juice concentrate

9 Claims, 2 Drawing Sheets

Figure 1:
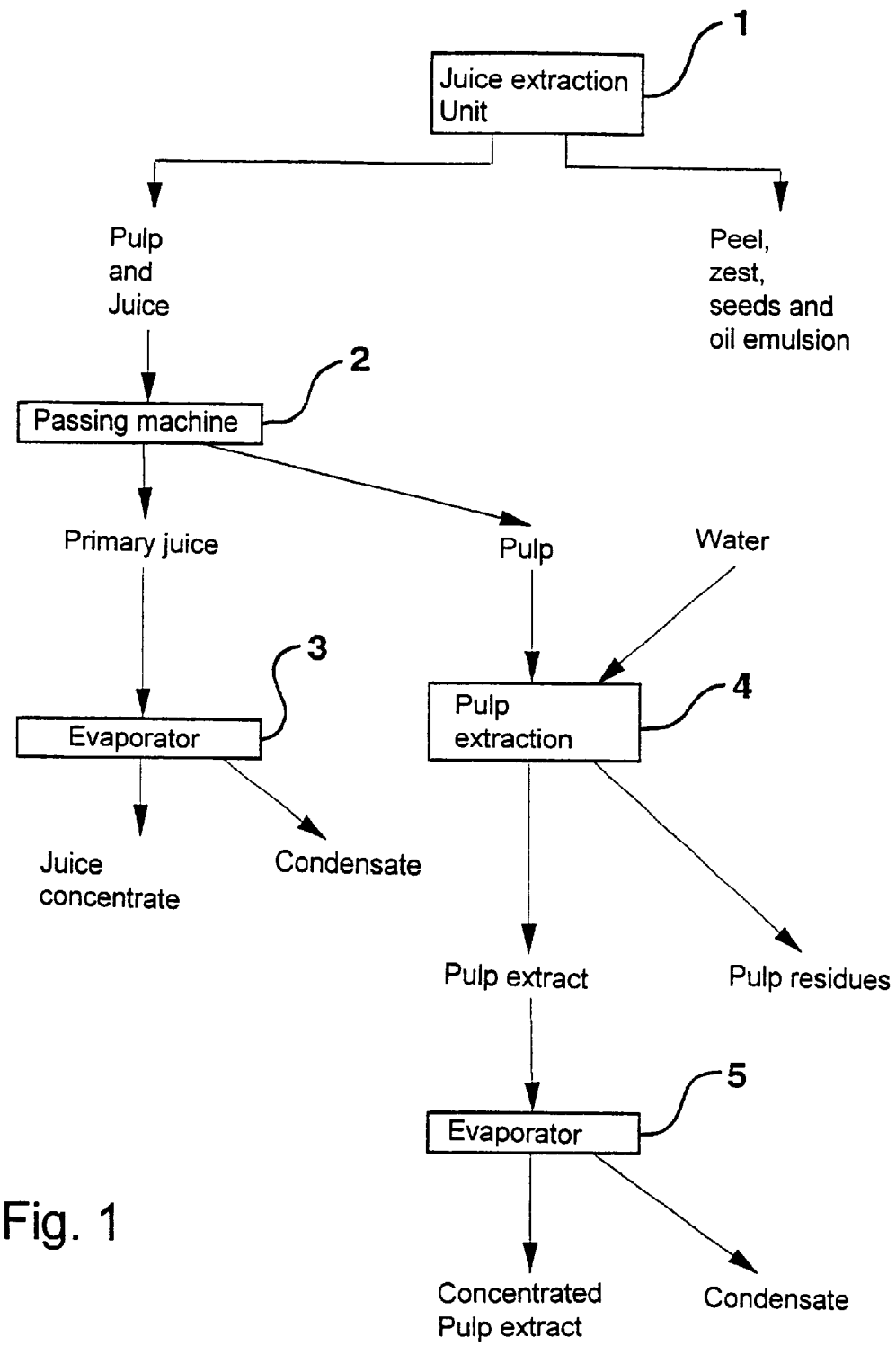

METHOD FOR INCREASING THE YIELD OF FRUIT JUICE IN THE EXTRACTION OF FRUIT JUICE CONCENTRATE

The invention relates in general to a method for extracting fruit juice concentrate and in particular to a method for increasing the yield of fruit juice in the extraction of fruit juice concentrate from citrus fruits.

Fruit juices are unfermented, but fermentable, alcohol-free products made above all from pomaceous fruits, grapes and citrus fruits, which possess the characteristic aroma, the characteristic taste and the characteristic colour of the juices concerned. The juices are extracted by mechanical means from fresh fruit or fruit made non-perishable by chilling, from which coarse and/or indigestible parts, such as for example peel and seeds have been removed, and which have been made non-perishable by physical. methods.

One problem with the production of fruit juices lies in the fact that after the comminution of the fruit by technical means in the production process (e.g. during juice extraction) uncontrolled enzyme and other reactions set in, as the destruction of the cells means that enzymes and other constituents are no longer separated from each other by the cell membranes.

One possibility of preventing these undesired reactions is by producing a fruit juice concentrate. For this purpose the mixture of pulp and fruit juice resulting after juice extraction is separated into fruit juice and pulp (fruit flesh) by means of a passing machine. The fruit juice is then processed by concentration to give fruit juice concentrate. The pulp can be made non-perishable by heat treatment and cooling or aseptic packaging. By means of these suitable processing steps the abovementioned reactions can be prevented. The restoration of the fruit juice is carried out by means of a re-dilution procedure, in which the quantity of water removed during concentration is put back into the fruit juice concentrate. In addition, part or all of the pulp removed during concentration can be admixed again.

Moreover producing the fruit juice concentrate in the producer country and subsequently re-diluting it in the consumer country results in a considerable reduction in transport costs, as the volume and weight of the concentrate are considerably lower than those of the actual fruit juice.

The extraction of fruit juice concentrate from citrus fruits is carried out by a known method, in which fruits are separated into several constituent groups in a juice extraction plant, i.e. into peel, zest, seeds and oil emulsion on the one hand, and into pulp and fruit juice on the other hand. This mixture of pulp and fruit juice is then fed into a passing machine where it is divided into pulp and primary juice. The primary juice is then further processed to produce fruit juice concentrate by a known method.

In a further process step the pulps produced during passing are submitted to pulp extraction, in which, with the addition of water, on the one hand pulp extract and on the other hand pulp residues are produced. These pulp residues are waste materials and are of no further use for drinks production. There are therefore for the most part dried and further processed, for example, into animal fodder or fertilizers.

The pulp extract is then fed into an evaporator. The aim of this process step is to thicken the pulp extract, and so the condensate is removed from the pulp extract. The pulp extract concentrated in this way is not suitable for the production of fruit juice and is mostly used as a base material for refreshing drinks.

This known method has several disadvantages:

During the pulp extraction stage, considerable quantities of juice are lost via the pulp residues, which could be used for fruit juice. This results in substantial financial losses.

The resultant pulp extract and thus also the concentrated pulp extract contain some constituents that adversely affect the taste of the refreshing drinks produced using the concentrated pulp extract.

In the known process, large quantities of residual fluid are produced. As explained above, a great deal of water has to be used in extraction of the pulp, and this water remains in the pulp residues following the extraction, or ends up as condensate after the evaporation of the pulp extract. The high water consumption and the high energy use in the subsequent removal of the water in the drying of the pulp residues and/or evaporation of the pulp extract give rise to high production costs. No further fruit juice is extracted in the process.

Finally it is desirable to minimise the quantity of concentrated pulp extract produced. There are good economic reasons for not producing any pulp extract, but for extracting the high quality residual juice contained in the pulp and using this in the production of fruit juice concentrate.

Consequently, it is the object of the present invention to provide a method for the production of fruit juice concentrate, in which the yield of usable fruit juice is increased and the quantity of residual fluid and waste materials is minimised.

The abobe object is fulfilled by the features of claim 1. Advantageous developments of the present invention are subject-matter of the sub-claims.

Figure 2:
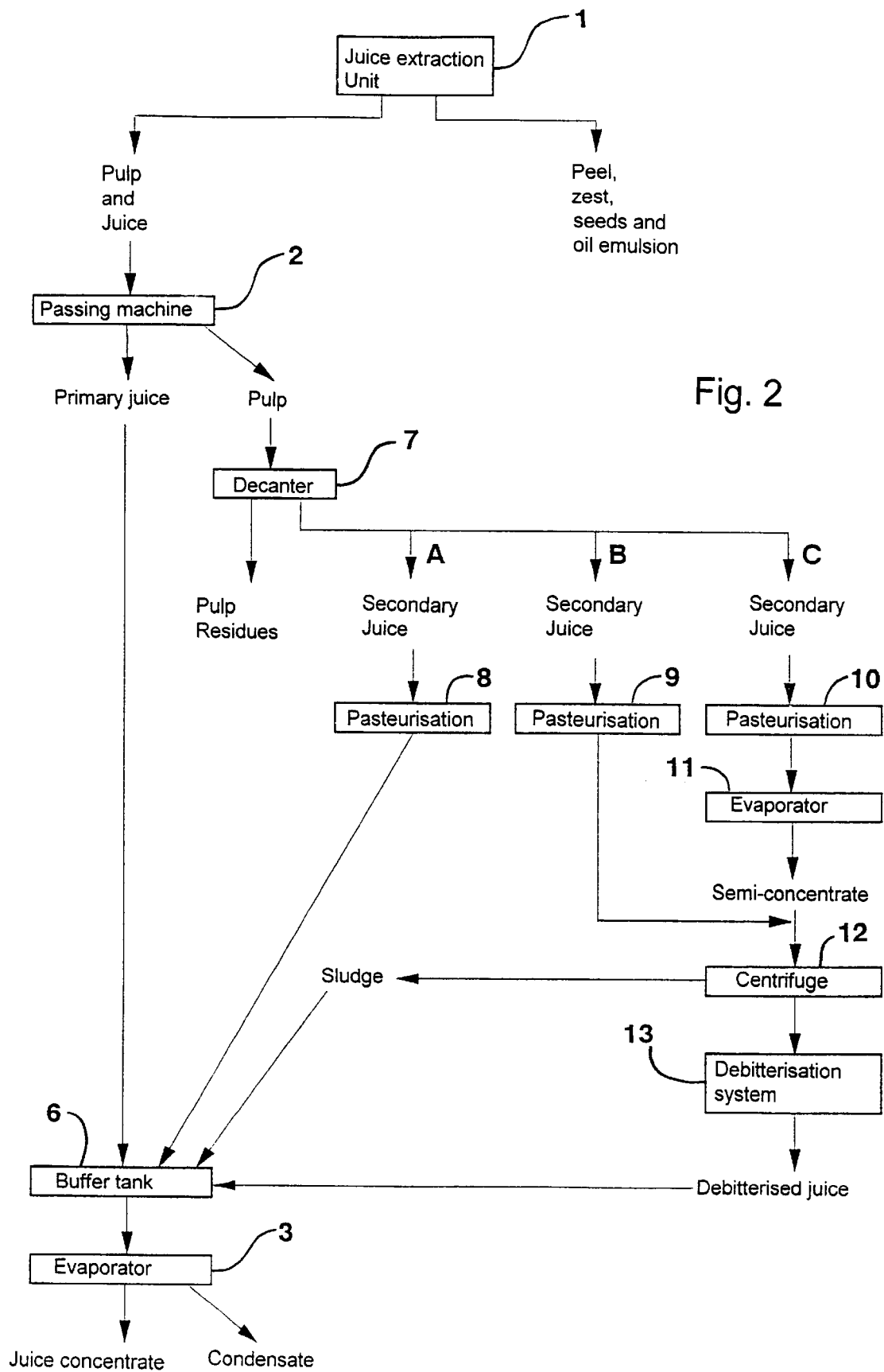

The present invention is now described on the basis of an example with reference to the attached drawings; these show:

FIG. 1 a diagrammatic representation of the process steps in a usual process for the production of fruit juice concentrate; and FIG. 2 a diagrammatic representation of the process according to the invention for the production of fruit juice concentrate.

In the following, reference is made to FIG. 1, in which the known process for the production of fruit juice concentrate is represented. First of all, fruit that have suffered attack by microbes (rotten fruit) are picked out. The remaining citrus fruits, to be processed into fruit juice concentrate, are then cleaned and fed into a juice extraction unit 1. There the juice is extracted from the citrus fruits and they are separated into two main groups of constituents. The first group comprises peel, zest, seeds and oil emulsion. The second group comprises a mixture of pulp and fruit juice.

This mixture of pulp and fruit juice is then fed into a passing machine 2 where it is divided into primary juice and pulp.

The primary juice is fed into an evaporator 3, where it is thickened. In this process step fruit juice concentrate is produced with condensate as a waste product. The fruit juice concentrate can now be stored in low-temperature tanks or put into drums. In these barrels it is delivered to the juice producer, where the fruit juice concentrate is further processed to produce drinkable fruit juice.

The pulp separated in the passing machine 2 then goes to a pulp extraction unit 4, where, with the addition of water, pulp extract and pulp residues are produced. The pulp residues are of no further use in drinks production. They can therefore be dried and subsequently further processed, for example, into animal fodder.

The pulp extract produced in the pulp extraction unit 4 is fed into an evaporator 5. In this process step the pulp extract is thickened, producing condensate and concentrated pulp extract. The concentrated pulp extract is used as a base material for refreshing drinks.

FIG. 2 shows the method for the processing of citrus fruits according to the invention. In this case too, the fruits are first sorted, cleaned and then fed into a fruit extraction unit 1. Just as in the process described above, the citrus fruits are also separated into two main constituent groups, the first group consisting of peel, zest, seeds and oil emulsion and the second group a mixture of pulp and fruit juice. This mixture of pulp and fruit juice can be either fed into a tubular heater (not shown), where at temperatures of 90 to 115° C. and for a duration of 20–60 seconds enzymes that are detrimental to quality are destroyed. To some extent lower temperatures above 50° C. are already sufficient to achieve denaturing and hence deactivation of the enzymes that are detrimental to quality. The heating should take place as quickly as possible following the comminution/juice extraction of the fruits, so as to minimise the time for which the enzymes are active. Subsequently the mixture of pulp and fruit juice (either directly from the juice extraction unit or via the tubular heater) is fed into a passing machine 2 where it is divided into primary juice and pulp. The primary juice is conveyed to a buffer tank 6 and then further processed as explained later. On the way to the buffer tank 6 the primary juice can be re-cooled (if it was heated before the passing machine) and degassed. It is also possible to free the primary juice of microbes by heating to a high temperature for a short time (90–115° C. for 20–60 seconds). Here too, to some extent lower temperatures above 50° C. are already sufficient, to achieve denaturing and hence deactivation of the enzymes that are detrimental to quality. In this alternative too, heating should take place as quickly as possible after the passing machine, so as to minimise the time for which the enzymes are active.

The pulp extracted by means of the passing machine 2 is a mixture of pulp solids and fruit juice constituents remaining in these. The pulp is passed to a decanter 7, where it is continuously separated into pulp residues and secondary juice. Instead of the decanter 7, other known forms of continuously operating centrifuges can also be used. The pulp residues are removed via the decanter spiral discharge, then dried and further processed, for example, into animal fodder or used as fertilizer. The secondary juice from the decanter 7 can pass through one of three possible process paths or a combination of these:

a) The first process path A is preferred in the case of secondary juices with a low bitter constituent content. As can be seen from FIG. 2, the secondary juice directly after the decanter 7 goes on to pasteurisation 8, which may take place, for example in a plate heater. The pasteurised juice is then conveyed to the buffer tank 6.

b) In the second process path B the secondary juice after the decanter 7 is conveyed to a plate heater where it is submitted to pasteurisation 9. Subsequently the pasteurised secondary juice is conveyed to a centrifuge 12, to separate fine sludge constituents from the secondary juice; these are then conveyed to the buffer tank 6 in a certain dosage. After centrifuging, the secondary juice, from which the sludge constituents have been removed, is conveyed to a debitterisation system 13 and debittered by means of an adsorption column. The juice thus debittered is then fed into the primary juice already contained in the buffer tank 6 in doses dependent on the quantity.

c) In the third process path C too, the secondary juice after the decanter 7 is conveyed to a plate heater where it is submitted to pasteurisation 10. The pasteurised secondary juice is then cooled down to the entry temperature for the evaporator 11 and worked up to a semi-concentrate (22 to 28 Brix). At the same time oil is removed during the evaporation process. The semi-concentrate is now conveyed to the centrifuge 12, to separate fine sludge constituents from the secondary juice; these are then conveyed to the buffer tank 6 in a dosage dependent on quantity. After centrifuging, the secondary juice (i.e. the semiconcentrate) from which the sludge constituents have been removed is also conveyed to the debitterisation system 13 and debittered by means of an adsorption column. The debittered juice is then fed into the primary juice already contained in the buffer tank 6 in doses dependent on the quantity.

With regard to process path C, it should be noted that the semi-concentrate after the evaporation process in the evaporator 11 does not need to be conveyed direct to the centrifuge 12. These two process steps (evaporation and centrifuging) can also be carried out at different sites. For this purpose, after evaporation, the semi-concentrate can first be stored in low-temperature tanks or poured aseptically into drums, which are then delivered to the juice producer, where the subsequent process steps are carried out.

The mixture of primary juice, further processed secondary juice and sludge constituents contained in the buffer tank 6 is then conveyed to an evaporator 3, where the juice is thickened. In this process step fruit juice concentrate is produced, with condensate as a waste product. The fruit juice concentrate can now, as already explained above, be stored in low-temperature tanks or poured into drums and later further processed into drinkable fruit juice.

It should be noted that the buffer tank is not strictly necessary for the process in itself. The primary juice and the secondary juices further processed in the different process paths A, B and C can also be conveyed direct to the evaporator 3. The buffer tank 6 serves here only for intermediate storage of juices that are not to be further processed immediately.

What is claimed is:

1. Method for the extraction of fruit juice concentrate, comprising the following steps:

juice extraction (1) of fruits, to produce a mixture of pulp and fruit juice, separation (2) of the mixture of pulp and fruit juice into pulp and primary juice, separation (7) of the pulp into pulp residues and secondary juice, pasteurization (8) of the secondary juice, admixture of the secondary juice to the primary juice, and further processing of the mixture of primary juice and secondary juice to give fruit juice concentrate.

2. Method according to claim 1, in which the separation of the pulp into pulp residues and secondary juice takes place with the aid of a decanter (7).

3. Method according to claims 1 or 2, in which the pasteurization of the secondary juice takes place as soon as the separation (7) of the pulp into pulp residues and secondary juice has taken place.

4. Method for the extraction of fruit juice concentrate, comprising the following steps:

juice extraction (1) of fruits, to produce a mixture of pulp and fruit juice, separation (2) of the mixture of pulp and fruit juice into pulp and primary juice, separation (7) of the pulp into pulp residues and secondary juice, pasteurization (9) of the secondary juice, centrifuging (12) of the secondary juice, to separate sludge constituents, debitterisation (13) of the secondary juice from which the sludge constituents have been removed, admixture of the debitterised secondary juice and the sludge constituents to the primary juice, and further processing of the mixture of primary juice, debitterised secondary juice and sludge constituents to give fruit juice concentrate.

5. Method according to claim 4, in which the separation of the pulp into pulp residues and secondary juice takes place with the aid of a decanter (7).

6. Method according to claims 4 or 5, in which the pasteurization of the secondary juice takes place as soon as the separation (7) of the pulp into pulp residues and secondary juice has taken place.

7. Method for the extraction of fruit juice concentrate, comprising the following steps:

juice extraction (1) of the fruits, to produce a mixture of pulp and fruit juice, separation (2) of the mixture of pulp and fruit juice into pulp and primary juice, separation (7) of the pulp into pulp residues and secondary juice, pasteurization (10) of the secondary juice, evaporation (11) of the secondary juice, to produce semi-concentrate, centrifuging (12) of the semi-concentrate, to separate sludge constituents, debitterisation (13) of the semi-concentrate from which the sludge constituents have been removed, admixture of the debitterised semi-concentrate and the sludge constituents to the primary juice, and further processing of the mixture of the primary juice, debitterised semi-concentrate and sludge constituents to give fruit juice concentrate.

8. Method according to claim 7, in which the separation of the pulp into pulp residues and secondary juice takes place with the aid of a decanter (7).

9. Method according to claims 7 or 8, in which the pasteurization of the secondary juice takes place as soon as the separation (7) of the pulp into pulp residues and secondary juice has taken place.

* * * * *

UNITED STATES PATENT AND TRADEMARK OFFICE
CERTIFICATE OF CORRECTION

PATENT NO.    : 6,312,748 B1
DATED         : November 6, 2001
INVENTOR(S)   : Hartinger It is certified that error appears in the above-identified patent and that said Letters Patent is hereby corrected as shown below:

<u>Title page,</u>
Insert:
-- Foreign Application Priority Data
   February 4, 1998 Germany 19806195.1 --

Signed and Sealed this

Third Day of September, 2002

Attest:

Attesting Officer

JAMES E. ROGAN
Director of the United States Patent and Trademark Office